United States Patent
Knoth et al.

(10) Patent No.: US 9,856,974 B2
(45) Date of Patent: Jan. 2, 2018

(54) HYDRAULIC CONTROL SYSTEM FOR A MULTIPLE MODE ELECTRO-MECHANICAL DRIVE UNIT OF AN AUTOMATIC TRANSMISSION

(71) Applicant: GM Global Technology Operations LLC, Detroit, MI (US)

(72) Inventors: Matthew R. Knoth, Lake Orion, MI (US); Michael D. Foster, Carmel, IN (US); Eric S. Tryon, Indianapolis, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 230 days.

(21) Appl. No.: 14/847,456

(22) Filed: Sep. 8, 2015

(65) Prior Publication Data
US 2017/0067558 A1 Mar. 9, 2017

(51) Int. Cl.
| | |
|---|---|
| *F16H 47/00* | (2006.01) |
| *F16H 61/02* | (2006.01) |
| *B60W 10/11* | (2012.01) |
| *B60W 20/00* | (2016.01) |
| *B60K 6/54* | (2007.10) |
| *B60K 6/387* | (2007.10) |
| *F16H 61/12* | (2010.01) |
| *F16H 61/686* | (2006.01) |

(52) U.S. Cl.
CPC ......... *F16H 61/0267* (2013.01); *B60K 6/387* (2013.01); *B60K 6/54* (2013.01); *B60W 10/11* (2013.01); *B60W 20/00* (2013.01); *F16H 61/12* (2013.01); *F16H 61/686* (2013.01); *B60Y 2200/92* (2013.01); *B60Y 2300/182* (2013.01); *B60Y 2300/42* (2013.01); *B60Y 2400/424* (2013.01); *Y10S 903/914* (2013.01); *Y10S 903/917* (2013.01)

(58) Field of Classification Search
CPC ............. F16H 61/0003; F16H 61/0021; F16H 61/0025
USPC ................ 74/335, 730.1, 731.1, 732.1, 733.1
See application file for complete search history.

(56) References Cited

U.S. PATENT DOCUMENTS

| | | | | |
|---|---|---|---|---|
| 5,063,813 | A * | 11/1991 | Lentz ................... | F16H 61/0206 477/131 |
| 5,417,626 | A * | 5/1995 | Gierer ................. | F16H 61/0021 477/117 |
| 5,931,757 | A | 8/1999 | Schmidt | |
| 8,464,851 | B2 * | 6/2013 | Moorman ........... | F16H 61/0206 192/3.3 |

(Continued)

*Primary Examiner* — Ha Dinh Ho (57) ABSTRACT

A hydraulic control system for a multiple mode electro-mechanical drive unit of a motor vehicle includes multiple torque transmitting mechanisms each including at least one friction clutch. Multiple clutch control valves are individually in fluid communication with one of the torque transmitting mechanisms and are operable when actuated to change a condition of the torque transmitting mechanisms from a clutch disconnected condition to a clutch engaged condition. Solenoid valves are individually paired with and in fluid communication with one of the clutch control valves. A normally open variable force solenoid valve is in fluid communication with the solenoid valves. Operation of the variable force solenoid valve sets a hydraulic pressure between any of the solenoid valves in an open condition and its paired clutch control valve.

20 Claims, 7 Drawing Sheets

(56) References Cited

U.S. PATENT DOCUMENTS

| | | | |
|---|---|---|---|
| 8,528,711 B2* | 9/2013 | Czoykowski | F16D 21/06 |
| | | | 192/3.58 |
| 8,783,135 B2 | 7/2014 | Knoth | |
| 8,904,893 B2* | 12/2014 | Moorman | F16H 61/0206 |
| | | | 192/3.58 |
| 8,942,901 B2* | 1/2015 | Lundberg | F16H 61/0251 |
| | | | 477/168 |

\* cited by examiner

HYDRAULIC CONTROL SYSTEM FOR A MULTIPLE MODE ELECTRO-MECHANICAL DRIVE UNIT OF AN AUTOMATIC TRANSMISSION

TECHNICAL FIELD

The invention relates to a hydraulic control system for an automatic transmission, and more particularly to a hydraulic control system for a hybrid automatic transmission having hydraulically operated clutches used for range selection.

BACKGROUND

A typical automatic transmission includes a hydraulic control system that is employed to provide cooling and lubrication to components within the transmission and to actuate a plurality of torque transmitting devices to allow synchronization for shifting between multiple gear ratios for transmission output. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. Via multiple valves and multiple solenoid valves individually controlling every clutch control valve, the pressurized hydraulic fluid is directed through a hydraulic fluid circuit to control shifting via torque transmitting devices. The pressurized hydraulic fluid is also directed to various subsystems including lubrication subsystems, cooling subsystems, and torque converter clutch control subsystems. The pressurized hydraulic fluid delivered to the shift actuators is used to engage or disengage the torque transmitting devices in order to obtain different gear ratios.

Known automatic transmissions generally operate in a plurality of modes of operation including out-of-park driving modes and a park mode. The out-of-park driving modes generally include the forward gear or speed ratios (i.e. a Drive mode), at least one reverse gear or speed ratio (i.e. a reverse mode), and a Neutral mode. Selection of the various driving modes is typically accomplished by engaging a shift lever or other driver interface device that is connected by a shifting cable or other mechanical connection to the transmission. Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission.

While previous transmission control systems are useful for their intended purpose, there is a need for new and improved hybrid transmission hydraulic control system configurations within transmissions which reduce the quantity of control valves and simplify control of the clutch control system, including during transmission default conditions. A default condition is a hydraulic state that the transmission experiences in the absence of electronic control. A transmission in default no longer has the capability to electronically command solenoids to achieve the desired gear state. The default condition may have been intentionally commanded (e.g. when diagnostics indicate corrupt solenoid drivers, corrupt controllers, controller shutdown at high temperatures) or can occur unintentionally due to a hardware failure (e.g. controller failure, wiring harness failure, solenoid driver failure). Accordingly, there is a need for an improved hydraulic control system for use in a hybrid hydraulically actuated automatic transmissions that reduces solenoid valve complexity and can provide different drive states during a default condition.

SUMMARY

A hydraulic control system for a hybrid transmission is provided. The hydraulic control system provides three (3) fixed gear ratios and four (4) EV modes, and multiple default conditions where the transmission loses electronic control when in a drive mode. The hydraulic control system includes six (6) normally low On-Off solenoids, one (1) normally high variable force solenoid, one (1) regulating valve for line pressure control, and six (6) On-Off spool valves for clutch actuation and motor cooling control. Additionally, there are a plurality of other passive devices such as one (1) accumulator, two (2) pressure relief valves, one (1) feed limit valve, and one (1) bypass valve.

The hydraulic control system for a multiple mode electro-mechanical drive unit of a motor vehicle includes multiple torque transmitting mechanisms each including at least one friction clutch. Multiple clutch control valves are individually in fluid communication with one of the torque transmitting mechanisms and are operable when actuated to change a condition of the torque transmitting mechanisms from a clutch disconnected condition to a clutch engaged condition. Solenoid valves are individually paired with and in fluid communication with one of the clutch control valves. A normally open variable force solenoid valve is in fluid communication with the line pressure control regulation valve. Operation of the variable force solenoid valve sets a hydraulic pressure of the system, and the actuator feed limit valve limits the maximum pressure between any of the solenoid valves in an open condition and its paired clutch control valve.

In one example of the hydraulic control system for a multiple mode electro-mechanical drive unit of a motor vehicle of the present disclosure, a main supply line contains a hydraulic fluid, having each of the torque transmitting mechanisms connected to the main supply line after the clutch control valve is actuated.

In yet another example of the hydraulic control system for a multiple mode electro-mechanical drive unit of a motor vehicle of the present disclosure, a pump operates to displace and pressurize the hydraulic fluid in the main supply line.

In yet another example of the hydraulic control system for a multiple mode electro-mechanical drive unit of a motor vehicle of the present disclosure, the pump is a fixed displacement pump.

In yet another example of the hydraulic control system for a multiple mode electro-mechanical drive unit of a motor vehicle of the present disclosure, a combined hydraulic header is provided, wherein each of the solenoid valves and the variable force solenoid valve is in fluid communication with the combined hydraulic header, and operation of the variable force solenoid valve acts to set a hydraulic pressure of a hydraulic fluid in the combined hydraulic header.

In yet another example of the hydraulic control system for a multiple mode electro-mechanical drive unit of a motor vehicle of the present disclosure, the multiple torque transmitting mechanisms include four torque transmitting mechanisms defining vehicle drive mechanisms, and a fifth torque transmitting mechanism defining a braking clutch.

In yet another example of the hydraulic control system for a multiple mode electro-mechanical drive unit of a motor vehicle of the present disclosure, a transmission control module is connected to and commands operation of each of the solenoid valves and the variable force solenoid valve.

In yet another example of the hydraulic control system for a multiple mode electro-mechanical drive unit of a motor vehicle of the present disclosure, the solenoid valves include a first, a second, a third, a fourth, and a fifth solenoid valve, any of the first, second, third, fourth, or fifth solenoid valves commanded to open by the transmission control module together with the paired clutch control valves are each exposed to a same hydraulic fluid pressure up to a limit set by an actuator feed limit valve.

In yet another example of the hydraulic control system for a multiple mode electro-mechanical drive unit of a motor vehicle of the present disclosure, the multiple solenoid valves are individually operable in one of an off condition having the solenoid valve closed, and an on condition having the solenoid valve open.

In yet another example of the hydraulic control system for a multiple mode electro-mechanical drive unit of a motor vehicle of the present disclosure, wherein predetermined ones of the solenoid valves are provided as variable force solenoid valves provided in a normally open condition, the predetermined ones of the solenoid valves permitting fluid communication to retain two of the clutch control valves in the clutch engaged condition during a default condition of the hydraulic control system wherein operational control of the solenoid valves is lost.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
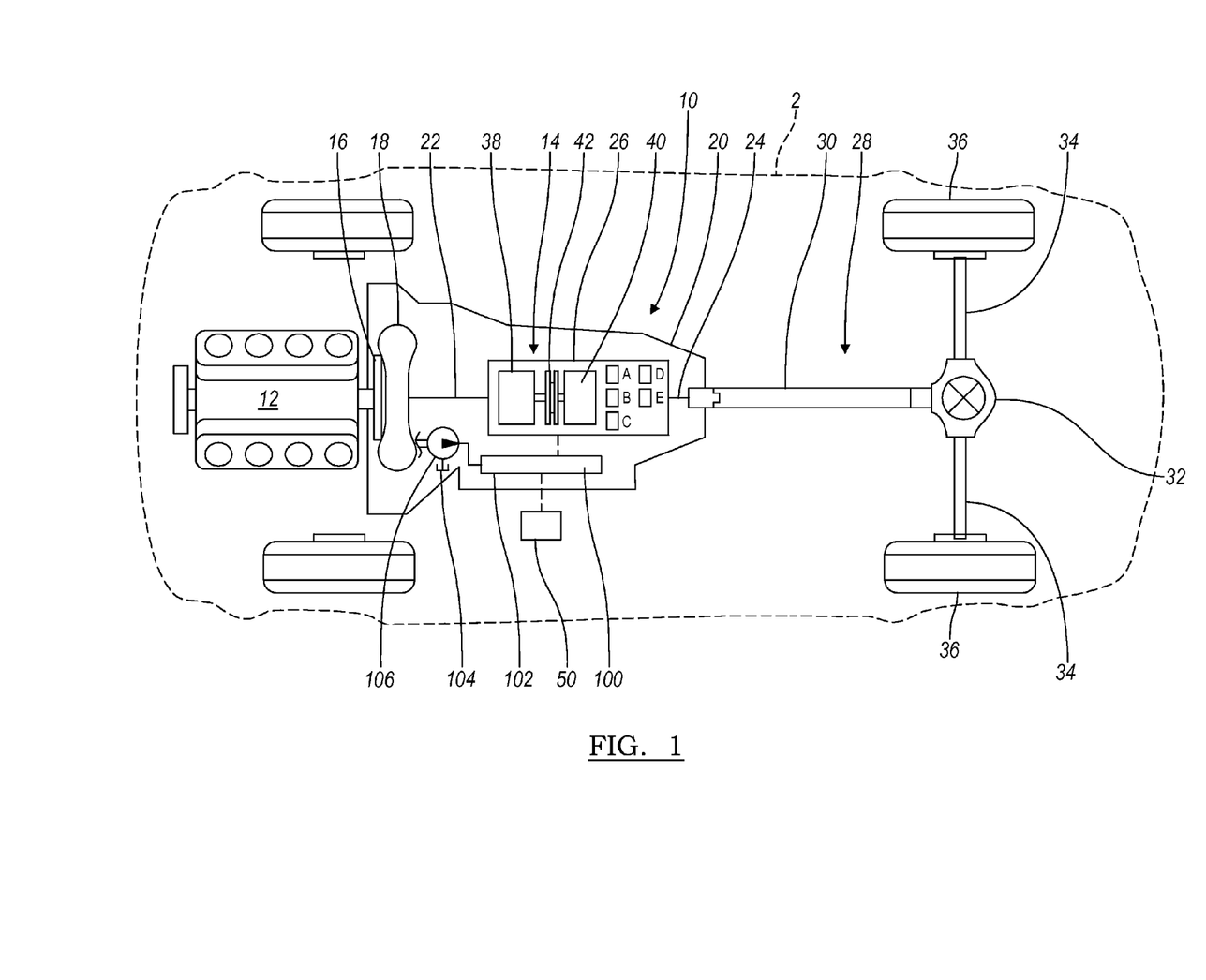
FIG. 1 is a is a top plan view of an exemplary powertrain of the present disclosure in a motor vehicle.

Referring to FIG. 1, a motor vehicle is shown and generally indicated by reference number 2. The motor vehicle 2 is illustrated as a passenger car, but it should be appreciated that the motor vehicle 2 may be any type of vehicle, such as a truck, van, sport-utility vehicle, etc. The motor vehicle 2 includes an exemplary powertrain 10. It should be appreciated at the outset that while a rear-wheel drive powertrain has been illustrated, the motor vehicle 2 may have a front-wheel drive powertrain without departing from the scope of the present disclosure. The powertrain 10 generally includes an engine 12 interconnected with a hybrid automatic transmission 14.

The engine 12 may be a conventional internal combustion engine or an electric engine, hybrid engine, or any other type of prime mover, without departing from the scope of the present disclosure. The engine 12 supplies a driving torque to the transmission 14 through a flexplate 16 or other connecting device that is connected to a starting device 18. The starting device 18 may be a hydrodynamic device, such as a fluid coupling or torque converter, a wet dual clutch, a dry torque damper with springs, or an electric motor. It should be appreciated that any starting device between the engine 12 and the transmission 14 may be employed including a dry launch clutch.

The transmission 14 has a typically cast, metal housing 20 which encloses and protects the various components of the transmission 14. The housing 20 includes a variety of apertures, passageways, shoulders and flanges which position and support these components. Generally speaking, the transmission 14 includes a transmission input shaft 22 and a transmission output shaft 24. Disposed between the transmission input shaft 22 and the transmission output shaft 24 is a gear and clutch arrangement 26. The transmission input shaft 22 is functionally interconnected with the engine 12 via the starting device 18 and receives input torque or power from the engine 12. Accordingly, the transmission input shaft 22 may be a turbine shaft in the case where the starting device 18 is a hydrodynamic device, dual input shafts where the starting device 18 is dual clutch, or a drive shaft where the starting device 18 is an electric motor. The transmission input shaft 22 is coupled to and provides drive torque to the gear and clutch arrangement 26. For the exemplary rear-wheel drive vehicle shown, the transmission output shaft 24 is connected with a final drive unit 28 which includes, for example, a prop-shaft 30, a differential assembly 32, and drive axles 34 connected to wheels 36.

The gear and clutch arrangement 26 includes first and second traction motors such as a first electric motor-generator 38 and a second electric motor-generator 40 defining an electro-mechanical drive unit which includes multiple gear sets defining a gear arrangement 42, five (5) torque transmitting mechanisms indicated schematically by reference letters A-E, and a plurality of shafts. The gear sets may include individual intermeshing gears, such as one or more planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The torque transmitting mechanisms A-E are selectively engageable individually or in combinations to initiate at least one of 3 fixed gear or speed ratios, 4 electrically variable (EV) modes, and one reverse gear or speed ratio, by selectively coupling individual gears within the gear sets to the transmission output shaft 24. In one aspect, the torque transmitting mechanisms A-D each include at least one friction clutch and according to several aspects multiple friction clutches designated A-1, B-1, C-1, D-1, respectively, while the torque transmitting mechanism E includes friction clutches E-1 which may be used as a friction brake B1. It should be appreciated that the specific arrangement and number of the gear sets and shafts within the transmission 14 may vary without departing from the scope of the present disclosure.

The motor vehicle 2 includes a transmission control module 50. The transmission control module 50 is preferably a non-generalized, electronic control device having a preprogrammed digital computer or processor, control logic or circuits, memory used to store data, and at least one I/O peripheral. The control logic includes or enables a plurality of logic routines for monitoring, manipulating, and generating data and control signals.

A hydraulic control system 100 connected to and controlled by the transmission control module 50 is disposed within a valve body 102 that contains and houses, via fluid paths and valve bores, most of the components of the hydraulic control system 100. These components include, but are not limited to, pressure regulation valves, directional valves, solenoids, etc. which are shown and described in greater detail in reference to FIGS. 2-4. The valve body 102 may be attached to a bottom of the transmission housing 20 in rear-wheel drive transmissions or attached to a front of the transmission housing 20 in front-wheel drive transmissions. The hydraulic control system 100 is operable to selectively engage the clutches A-1, B-1, C-1, D-1, E-1 of the torque transmitting mechanisms A-E and to provide cooling and lubrication to the transmission 14 by selectively communicating a hydraulic fluid from a sump 104 under pressure from either a pump such as a fixed displacement pump 106, or an accumulator (not shown), or an auxiliary electric pump (not shown). The pump 106 may be driven by the engine 12 or by an auxiliary engine or electric motor.

Referring to FIGS. 2A-2B and again to FIG. 1, a portion of the hydraulic control system 100 is illustrated. The hydraulic control system 100 generally includes a plurality of interconnected or hydraulically communicating subsystems including a solenoid control subsystem 108 for actuation of multiple On-Off (normally low) solenoid valves and one variable force solenoid valve, and a pressure regulating and clutch control subsystem 110 for operation of multiple clutch control valves C1, C2, C3, C4, C5 and the clutches A-1, B-1, C-1, D-1, E-1 of the torque transmitting mechanisms A-E. Electronic transmission range selection (ETRS) components providing for electronic transmission control can also be optionally provided. The hydraulic control system 100 may also include various other subsystems or modules not illustrated in the drawings, such as a lubrication subsystem, and a cooling subsystem, each in communication with the pressure regulating and clutch control subsystem 110.

Figure 2A:
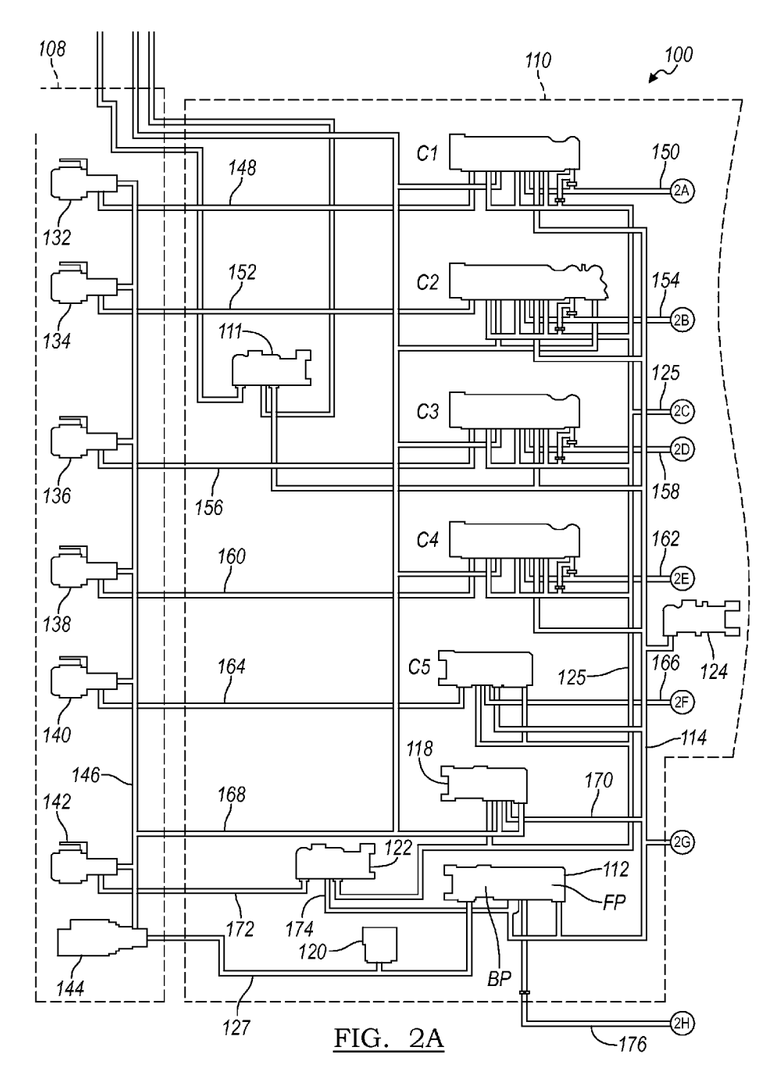
FIGS. 2A-2B provide a diagram of a portion of a hydraulic control system according to the principles of the present disclosure.
Figure 2B:
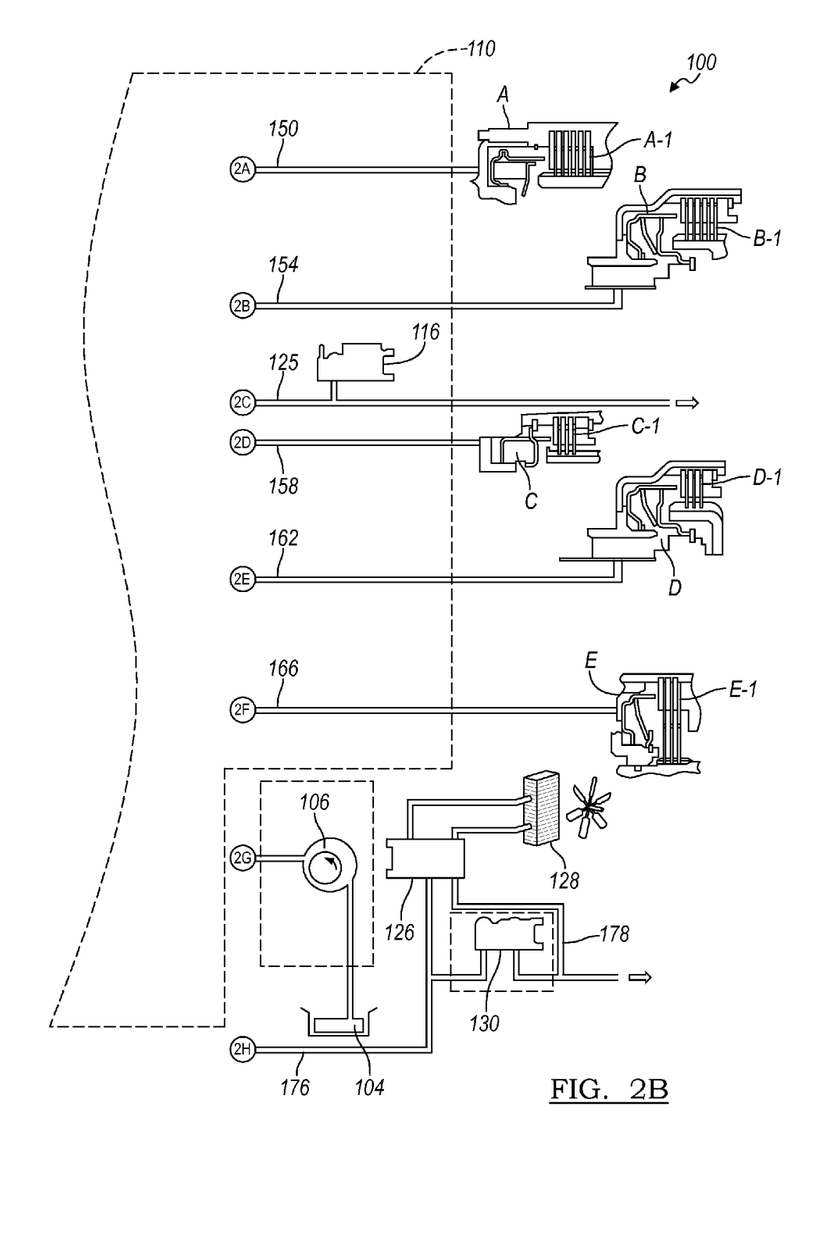

The pressure regulating and clutch control subsystem 110 is operable to provide and regulate pressurized hydraulic fluid, such as transmission oil, throughout the hydraulic control system 100. The pressure regulating and clutch control subsystem 110 draws hydraulic fluid from the sump 104. The sump 104 is a tank or reservoir preferably disposed at the bottom of the transmission housing 20 to which the hydraulic fluid returns and collects from various components and regions of the transmission. The hydraulic fluid is forced from the sump 104 and communicated throughout the hydraulic control system 100 via the pump 106. The pump 106 may be, for example, a gear pump, a vane pump, a gerotor pump, or any other positive or fixed displacement pump. The hydraulic fluid from the pump 106 is controlled by a pressure regulator valve 112. The pressure regulator valve 112 regulates the pressure of the hydraulic fluid from the pump 106 and feeds pressurized hydraulic fluid at line pressure to a main supply line 114. The main supply line 114 may include other branches and feed other subsystems without departing from the scope of the present invention. The pressure regulating and clutch control subsystem 110 may also include various other valves and solenoid valves, without departing from the scope of the present disclosure.

The main supply line 114 feeds hydraulic oil to the solenoid control subsystem 108, the pressure regulating and clutch control subsystem 110, and when present, the ETRS subsystem components. The main supply line 114 feeds hydraulic line pressure to the clutch control valve C1, the clutch control valve C2, the clutch control valve C3, the clutch control valve C4, and the clutch control valve C5. The hydraulic control system 100 controls the clutch control valves C1, C2, C3, C4, C5 to individually or in combination direct pressurized hydraulic oil to control engagement and release of the clutches A-1, B-1, C-1, D-1, E-1 of the torque transmitting mechanisms A-E. The pressure regulating and clutch control subsystem 110 also includes the pressure regulator valve 112, an exhaust backflow regulator valve 116, an actuator feed limiter valve 118, a boost accumulator 120, a motor cooling control valve 122, a main supply line pressure relief valve 124, and the plurality of the clutches A-1, B-1, C-1, D-1, E-1 of the torque transmitting mechanisms A-E and clutch control valves C1, C2, C3, C4, C5 each associated with one of the torque transmitting mechanisms A-E, as will be described below.

When present, the ETRS subsystem components generally include an ETRS valve assembly 111. The ETRS valve assembly 111 is part of a subsystem architecture which is optionally added to convert an electronic input for a requested range selection (i.e., drive, reverse, park, or neutral) into hydraulic and mechanical commands. The hydraulic commands use line pressure hydraulic fluid from the pressure regulating and clutch control subsystem 110 via the main supply line 114 to supply hydraulic fluid to the components served by ETRS valve assembly 111. The mechanical commands may include operations such as engaging and disengaging a park mechanism (not shown), which may be a conventional park mechanism that limits rotation of the transmission output shaft 26 or any other type of vehicle motion arresting system.

The pressure regulating PR valve 112 includes a boost pocket BP having an internal area larger than a feedback pocket FP located to the right as viewed in FIG. 2A. A lower hydraulic pressure in the boost pocket BP which is connected to solenoid valves in the solenoid control subsystem 108 is balanced by a higher hydraulic pressure in the feedback pocket FP which is connected to the main supply line 114. The pressure regulating valve 112 acts to balance hydraulic operating pressure in the hydraulic control system 100.

The exhaust backfill regulator valve 116 is connected to a backfill circuit line 125 which collects and forwards hydraulic oil leakage from the clutch control valves C1, C2, C3, C4, C5, as well as any leakage from non-operational components, and thereby maintains a continuous flow of hydraulic oil to the stators of the first electric motor-generator 38 and the second electric motor-generator 40, as well as to the clutches A-1, B-1, C-1, D-1, E-1 of the torque transmitting mechanisms A-E, thereby lubricating and cooling the first electric motor-generator 38 and the second electric motor-generator 40 and the clutches A-1, B-1, C-1, D-1, E-1 of the torque transmitting mechanisms A-E. The exhaust backfill regulator valve 116 also provides gross pressure protection of a backfill circuit line 125, which may normally have an operating pressure of approximately 30 kPa. The exhaust backfill regulator valve 116 will open to exhaust pressure in the backfill circuit line 125 exceeding a desired threshold, which may otherwise detrimentally effect the condition of the clutches A-1, B-1, C-1, D-1, E-1 of any of the torque transmitting mechanisms A-E.

The actuator feed limiter valve 118 operates to limit the maximum pressure applied to the solenoid valves of the solenoid control subsystem 108.

The boost accumulator 120 normalizes or limits system pressure oscillations from operation of the variable force solenoid (VFS) valve 144 of the solenoid control subsystem 108, described in greater detail below, which is controlled by a signal from the transmission control module 50. The boost accumulator 120 also normalizes or limits system pressure oscillations due to operation of the fixed displacement pump 106, whose reciprocating operation produces system pressure oscillations. The boost accumulator 120 may be set for example such that it is active for the entire operating pressure range of the boost circuit 127.

The motor cooling control valve 122 is a normally closed valve providing, when open, an active cooling condition to increase a flow of cooling hydraulic oil to the stators of the first electric motor-generator 38 and the second electric motor-generator 40, and to the clutches A-1, B-1, C-1, D-1, E-1 of the torque transmitting mechanisms A-E when normal or passive oil flow provided by leakage past the clutch control valves C1, C2, C3, C4, C5 and from the backfill circuit 125 is insufficient to cool the first electric motor-generator 38, the second electric motor-generator 40 and/or the clutches A-1, B-1, C-1, D-1, E-1 of the torque transmitting mechanisms A-E. The motor cooling control valve 122 when opened actively increases oil flow to the first electric motor-generator 38, the second electric motor-generator 40, and to the clutches A-1, B-1, C-1, D-1, E-1 of the torque transmitting mechanisms A-E. While this increased oil flow is beneficial under certain operating conditions, it is only desirable when increased hydraulic cooling oil is required, because the increased oil flow when the motor cooling control valve 122 is open, must be supplied by additional oil from the pump 106, thereby increasing energy requirements of the system.

The pressure relief valve 124 is connected to the main supply line 114. The pressure relief valve 124 protects against a pressure in the main supply line 114 exceeding a desired maximum or set-point pressure.

A thermal bypass valve 126 fluidly connected to a discharge port of the PR valve 112 senses a temperature of the system hydraulic oil, and is set to open when the temperature of the hydraulic oil exceeds a predetermined temperature. Thermal bypass valve 126 is normally closed to prevent hydraulic oil flow to a hydraulic oil heat exchanger 128, thereby allowing the hydraulic oil to warm up during system startup. Hydraulic oil is normally supplied via the thermal bypass valve 126 to lubricate components of a transmission lubrication circuit. When the hydraulic oil temperature reaches the predetermined temperature, thermal bypass valve 126 opens allowing hydraulic oil flow through the hydraulic oil heat exchanger 128 to be cooled prior to flowing to the lubricated components of the transmission lubrication circuit.

A coolant relief valve 130 connects into the line which feeds hydraulic oil to the thermal bypass valve 126. If any of the lines which feed oil to the transmission lubrication circuit become blocked, the coolant relief valve 130 opens. This ensures there is always a minimum flow of lubrication oil to the transmission lubrication circuit, even if the oil is above the predetermined temperature at which cooling using the hydraulic oil heat exchanger 128 is normally required.

The transmission control module 50 is connected to and commands operation of each solenoid of a plurality of normally low (off or normally closed) solenoid valves of the solenoid control subsystem 108. The normally low (off) solenoid valves of the solenoid control subsystem 108 include a first solenoid valve 132, a second solenoid valve 134, a third solenoid valve 136, a fourth solenoid valve 138, a fifth solenoid valve 140, each operationally paired with and in fluid communication with one of the clutch control valves C1, C2, C3, C4, C5. A sixth solenoid valve 142 is in fluid communication with the motor cooling control valve 122, and when energized to open permits hydraulic fluid flow through the motor cooling control valve 122. According to several aspects, the solenoid control subsystem 108 also includes only a single variable output solenoid valve, provided as the variable force solenoid valve 144. The solenoid of variable force solenoid valve 144 is normally high, such that variable force solenoid valve 144 is normally open. The transmission control module 50 is also connected to and commands operation of the variable force solenoid valve 144.

The hydraulic control system 100 of the present disclosure differs from known transmission control systems in its provision of only a single variable output valve, variable force solenoid valve 144, used to control hydraulic oil pressure delivered to any one or all of the clutch control valves C1, C2, C3, C4, C5. The solenoid of variable force solenoid valve 144 receives an operational signal from the transmission control module 50, which is connected by a hydraulic line 127 to the PR valve 112, and which also contains the boost accumulator 120. Variable force solenoid valve 144, together with the pressure regulating PR valve 112 and the boost accumulator 120 are used to set or vary the necessary operational pressure in a combined hydraulic header 146 connected to each of the first solenoid valve 132, the second solenoid valve 134, the third solenoid valve 136, the fourth solenoid valve 138, the fifth solenoid valve 140, and the sixth solenoid valve 142. The hydraulic oil in the combined hydraulic header 146 can be provided to any desired one or combination of any of the clutch control valves C1, C2, C3, C4, C5 by an open or on signal command provided by the transmission control module 50 to any of the first, second, third, fourth, fifth, or sixth solenoid valves 132, 134, 136, 138, 140, 142. It is noted system line pressure may exceed the pressure in the combined hydraulic header 146.

Any of the first, second, third, fourth, fifth, or sixth solenoid valves 132, 134, 136, 138, 140, 142 commanded to open by the transmission control module 50 are each exposed to the same hydraulic fluid pressure present in the combined hydraulic header 146, therefore none of the first, second, third, fourth, or fifth solenoid valves 132, 134, 136, 138, 140 delivers a different hydraulic pressure to its paired or associated clutch control valve C1, C2, C3, C4, C5 than received by any of the other clutch control valves C1, C2, C3, C4, C5.

For example, if the torque demand, combined with the sensed operating conditions of the vehicle (e.g., speed, acceleration/deceleration rate, accelerator pedal position, etc.) requires actuation of the clutches B1, D1 of torque transmitting mechanisms B and D, the transmission control module 50 signals the second and fourth solenoid valves 134, 138 to change from normally low (off-valve closed) to high (on-valve open). The second and fourth solenoid valves 134, 138 open directing hydraulic oil in the combined hydraulic header 146 to reposition clutch control valves C2 and C4 to engage the clutches B1, D1 of torque transmitting mechanisms B and D.

The solenoids of the first, second, third, fourth, fifth, and sixth solenoid valves 132, 134, 136, 138, 140, 142 are normally low (off) and can be positioned only in the low (off) position or the high (on) or valve open position. The first, second, third, fourth, fifth, and sixth solenoid valves 132, 134, 136, 138, 140, 142 do not have variable output capability, and therefore cannot be used to vary the hydraulic pressure to the clutches A-1, B-1, C-1, D-1, E-1 of the torque transmitting mechanisms A-E. According to several aspects, only the variable force solenoid valve 144 of the solenoid control subsystem 108 can be operated to vary hydraulic pressure. The clutch control valves C1, C2, C3, C4, C5 are therefore either isolated from hydraulic pressure in the combined hydraulic header 146 when the first, second, third, fourth, and/or fifth solenoid valves 132, 134, 136, 138, 140 are closed, or are exposed to the full hydraulic pressure in the combined hydraulic header 146 when the solenoid valves are open.

The hydraulic control system 100 of the present disclosure identifies which of the torque transmitting mechanisms A-D requires the highest hydraulic pressure to maintain the torque at the operating condition, and sets or controls the position of variable force solenoid valve 144 to maintain pressure in the main supply line 114 at this pressure. The other operating clutches A-1, B-1, C-1, D-1 of the remaining ones of the torque transmitting mechanisms A-D will therefore all be controlled at a higher pressure than the respective torque transmitting mechanisms A-D require to meet its operational demand. This simplifies the components and operating conditions of hydraulic control system 100.

The clutch control valve C1 controls the actuation of the clutches A-1 of torque transmitting mechanism A. The clutch control valve C1 includes multiple ports including a port connected to the main supply line 114. The clutch control valve C1 is moveable away from an off or disengaged condition by opening first solenoid valve 132. As previously noted, the first solenoid valve 132 is selected as a normally low (off) solenoid valve which in the off or closed condition prevents operation of the clutches A-1 of the torque transmitting mechanism A. In the disengaged position, the first solenoid valve 132 is closed, isolating hydraulic pressure in the combined hydraulic header 146 from a fluid feed line 148 connected to clutch control valve C1. In the engaged position, the first solenoid valve 132 is open, which connects hydraulic pressure in the combined hydraulic header 146 via the fluid feed line 148 to clutch control valve C1, and a port in the clutch control valve C1 opens delivering hydraulic pressure via a clutch supply line 150 to frictionally couple the clutches A-1 of the torque transmitting mechanism A. The clutch control valve C1 can further include a valve or spool slidably disposed within a bore formed in the valve body moveable between the disengaged position, shown in FIG. 2A, and the engaged position (not shown) where the valve is moved to the right. The main line pressure circuit or main line 114, is ultimately routed to the clutches A-E. The pressure in the main line pressure circuit is determined by the transmission control module 50 using "line pressure arbitration logic", also known as "main pressure arbitration logic". The variable force solenoid 114 is adjusted based on the highest required main line pressure.

The clutch control valve C2 controls the actuation of the clutches B-1 of torque transmitting mechanism B. The clutch control valve C2 includes multiple ports including a port connected to the main supply line 114. The clutch control valve C2 is moveable away from an off or disengaged condition by opening second solenoid valve 134. As previously noted, the second solenoid valve 134 is selected as a normally low (off) solenoid valve which in the off or closed condition prevents operation of the clutches B-1 of the torque transmitting mechanism B. In the disengaged position, the second solenoid valve 134 is closed, isolating hydraulic pressure in the combined hydraulic header 146 from a fluid feed line 152 connected to clutch control valve C2. In the engaged position, the second solenoid valve 134 is open, which connects hydraulic pressure in the combined hydraulic header 146 via the fluid feed line 152 to clutch control valve C2, and a port in the clutch control valve C2 opens delivering hydraulic pressure via a clutch supply line 154 to the clutches B-1 of the torque transmitting mechanism B. The clutch control valve C2 can further include a valve or spool slidably disposed within a bore formed in the valve body moveable between the disengaged position, shown in FIG. 2A, and the engaged position (not shown) where the valve is moved to the right.

The clutch control valve C3 controls the actuation of the clutches C-1 of torque transmitting mechanism C. The clutch control valve C3 includes multiple ports including a port connected to the main supply line 114. The clutch control valve C3 is moveable away from an off or disengaged condition by opening the third solenoid valve 136. As previously noted, the third solenoid valve 136 is selected as a normally low (off) solenoid valve which in the off or closed condition prevents operation of the clutches C-1 of the torque transmitting mechanism C. In the disengaged position, the third solenoid valve 136 is closed, isolating hydraulic pressure in the combined hydraulic header 146 from a fluid feed line 156 connected to clutch control valve C3. In the engaged position, the third solenoid valve 136 is open, which connects hydraulic pressure in the combined hydraulic header 146 via the fluid feed line 156 to clutch control valve C3, and a port in the clutch control valve C3 opens delivering hydraulic pressure via a clutch supply line 158 to the clutches C-1 of the torque transmitting mechanism C. The clutch control valve C3 can further include a valve or spool slidably disposed within a bore formed in the valve body moveable between the disengaged position, shown in FIG. 2A, and the engaged position (not shown) where the valve is moved to the right.

The clutch control valve C4 controls the actuation of the clutches D-1 of torque transmitting mechanism D. The clutch control valve C4 includes multiple ports including a port connected to the main supply line 114. The clutch control valve C4 is moveable away from an off or disengaged condition by opening fourth solenoid valve 138. As previously noted, the fourth solenoid valve 138 is selected as a normally low (off) solenoid valve which in the off or closed condition prevents operation of the clutches D-1 of the torque transmitting mechanism D. In the disengaged position, the fourth solenoid valve 138 is closed, isolating hydraulic pressure in the combined hydraulic header 146 from a fluid feed line 160 connected to clutch control valve C4. In the engaged position, the fourth solenoid valve 138 is open, which connects hydraulic pressure in the combined hydraulic header 146 via the fluid feed line 160 to clutch control valve C4, and a port in the clutch control valve C4 opens delivering hydraulic pressure via a clutch supply line 162 to the clutches D-1 of the torque transmitting mechanism D. The clutch control valve C4 can further include a valve or spool slidably disposed within a bore formed in the valve body moveable between the disengaged position, shown in FIG. 2A, and the engaged position (not shown) where the valve is moved to the right.

The clutch control valve C5 controls the actuation of the clutches E-1 of torque transmitting mechanism E, which as previously noted can be used as a braking clutch, used to hold the engine 12 steady. The clutch control valve C5 includes multiple ports including a port connected to the main supply line 114. The clutch control valve C5 is moveable away from an off or disengaged condition by opening fifth solenoid valve 140. As previously noted, the fifth solenoid valve 140 is selected as a normally low (off) solenoid valve which in the off or closed condition prevents operation of the clutches E-1 of the torque transmitting mechanism E. In the disengaged position, the fifth solenoid valve 140 is closed, isolating hydraulic pressure in the combined hydraulic header 146 from a fluid feed line 164 connected to clutch control valve C5. In the engaged position, the fifth solenoid valve 140 is open, which connects hydraulic pressure in the combined hydraulic header 146 via the fluid feed line 164 to clutch control valve C5, and a port in the clutch control valve C5 opens delivering hydraulic pressure via a clutch supply line 166 to the clutches E1 of the torque transmitting mechanism E.

With continued reference to FIGS. 1 and 2A-2B, the actuator feed limiter valve 118 is connected via a common line 168 to the combined hydraulic header 146, and the actuator feed limiter valve 118 is connected to the main supply line 114 by a feed limiter supply line 170. The motor cooling valve 122 is connected to the sixth solenoid valve 142 by a motor cooling valve fluid feed line 172, and to the pressure regulating PR valve 112 by a motor cooling valve connection line 174. The pressure regulating PR valve 112 is connected by a heat exchanger connection line 176, and the discharge from the thermal bypass valve 126 is connected to the transfer lube system by a transfer line 178.

The hydraulic control system 100 is operable to provide three alternative forward gear ratios, and four EV modes. During a transmission default condition when in a drive mode of operation, several alternative default modes of operation are provided. During a default condition where the transmission 14 experiences an absence of electronic control, the transmission 14 no longer has the capability to electronically command the solenoids of the solenoid control subsystem 108 to achieve the desired gear state. Accordingly, although the VFS solenoid valve 144 remains open, the solenoids of the first, second, third, fourth, fifth, and sixth solenoid valves 132, 134, 136, 138, 140 remain deactivated and the corresponding clutch control valves C1, C2, C3, C4, C5 are in the disengaged position. Meanwhile, the regulated pressure supplied to the main supply line 114 from the pressure regulating and clutch control subsystem 110 defaults to the pressure defined by the design of the feed limiter valve 118 and the pressure regulation PR valve 112. During the default condition for the system defined in FIGS. 2A-2B, the clutches of transmission 12 default to a neutral (non-engaged) position.

Referring to FIGS. 3A-3B and again to FIGS. 2A-2B, a hydraulic control system 200 is modified from the hydraulic control system 100 by modifying components of the solenoid control subsystem 108 to create a solenoid control subsystem 202. For solenoid control subsystem 202, the second and fourth solenoid valves 134, 138 of solenoid control subsystem 108 are replaced with normally high (open) variable output solenoid valves 204, 206 respectively. Because the variable force solenoid valve 144 is retained, which provides a normally high or open valve condition, hydraulic pressure available in the combined hydraulic header 146 remains available. Hydraulic pressure can be shunted via the normally open variable output solenoid valves 204, 206, without the electronic control normally available to signal the solenoids to vary a pressure output of the to the variable output solenoid valves 204, 206. With the availability of the normally open variable output solenoid valves 204, 206, continued engagement of clutch control valves C2 and C4 is possible. This provides operation of the clutches of the torque transmitting mechanisms B and D, therefore allowing transmission 12 to operate in a default condition.

Figure 3A:
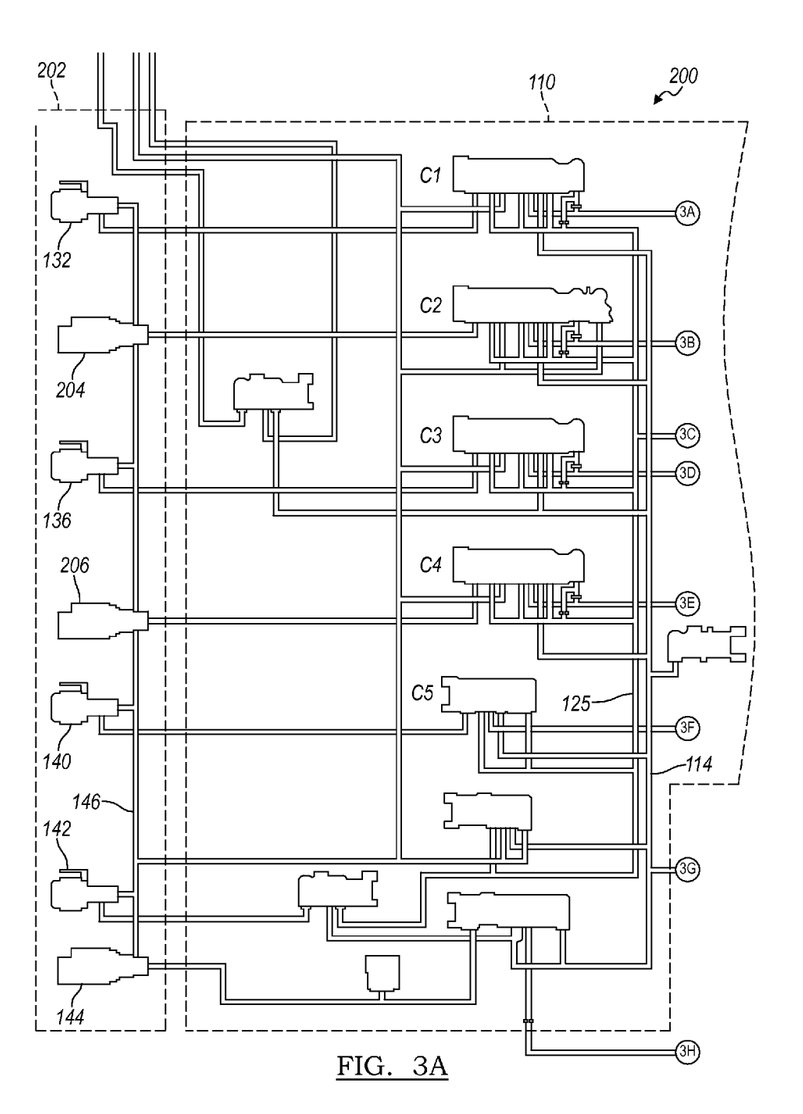
FIGS. 3A-3B provide a diagram of a portion of a hydraulic control system modified from the hydraulic control system of FIGS. 2A-2B.
Figure 3B:
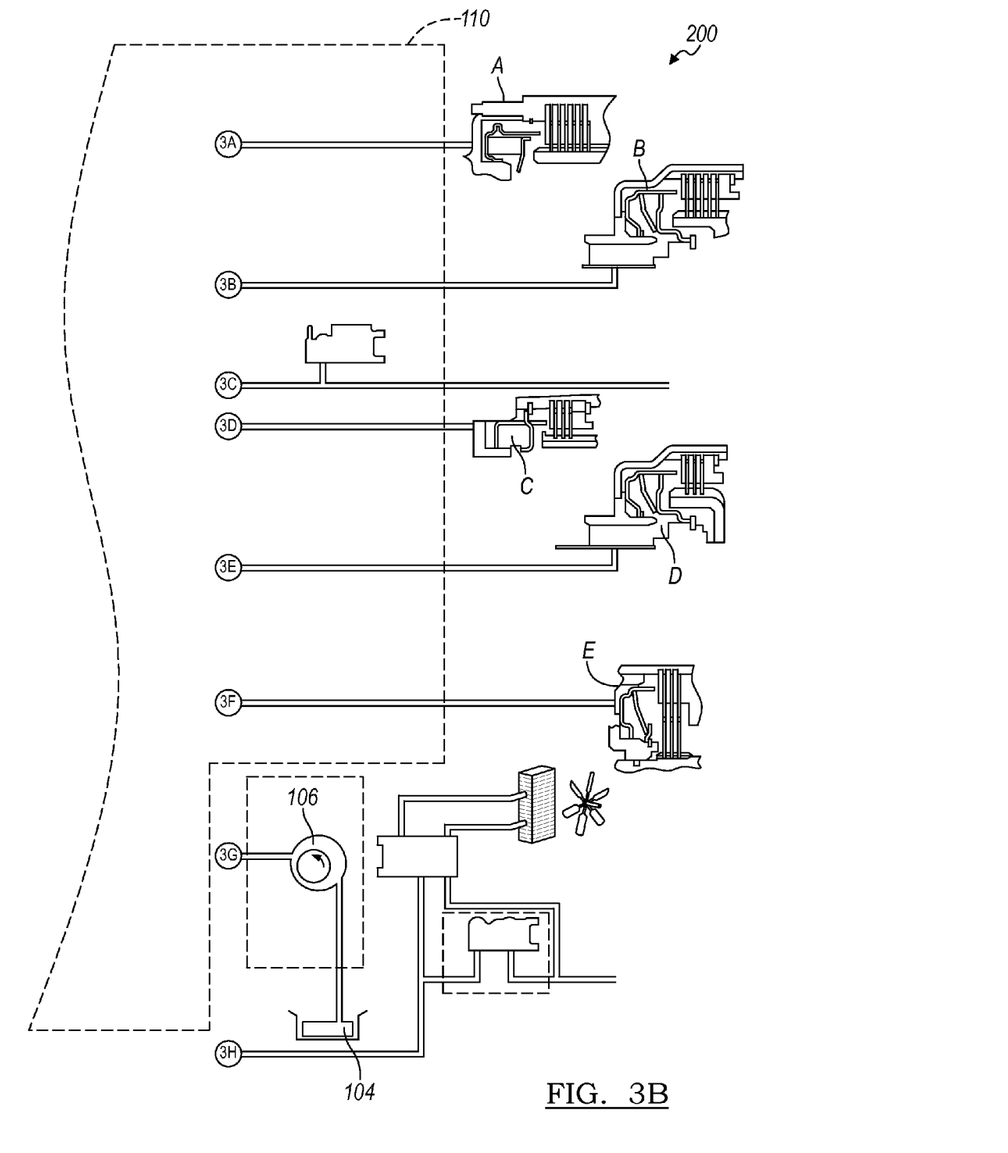

Referring to FIGS. 4A-4B and again to FIGS. 3A-3B, a hydraulic control system 300 is modified from the hydraulic control system 200. Hydraulic control system 300 further includes a solenoid control subsystem 302 modified from solenoid control subsystem 202 by the further addition of a normally low (off) solenoid valve 304. In addition, a blocking valve 306 is positioned between the solenoid valve 304 and the clutch control valve C4. Instead of directly feeding the clutch control valve C4 from the main supply line 114, a hydraulic line 308 is connected to the main supply line 114, which is connected to the blocking valve 306. A blocking valve discharge line 308 directs hydraulic oil from the blocking valve 306 to the clutch control valve C4.

Figure 4A:
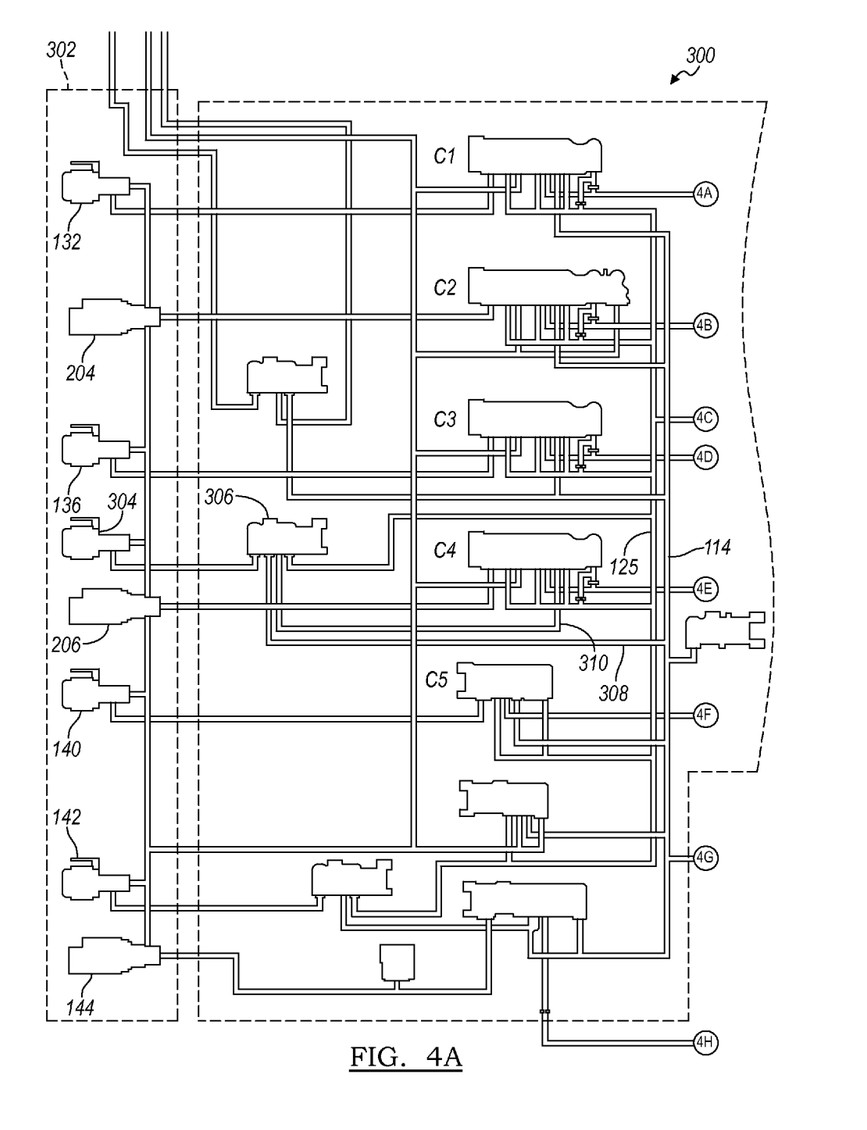
FIGS. 4A-4B provide a diagram of a portion of a hydraulic control system modified from the hydraulic control system of FIGS. 3A-3B.
Figure 4B:
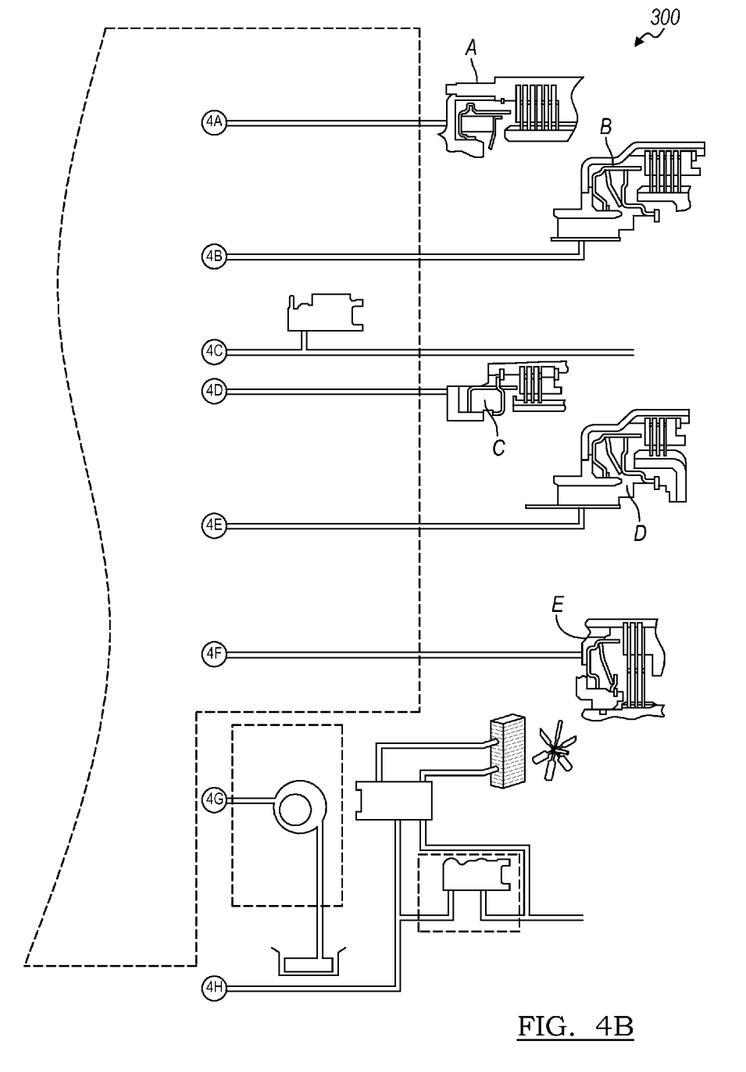

During normal system operation the solenoid valve 304 is closed, and the blocking valve 306 is normally closed. During a default condition, the open position of VFS solenoid valve 204 permits continued operation of the torque transmitting mechanism B. Using an alternate source of control power (not shown), the solenoid valve 304 is opened, which opens the blocking valve 306 to allow hydraulic pressure in the main supply line 114 to be directed to the clutch control valve C4, permitting selected continued operation of the torque transmitting mechanism D, thereby providing additional torque and gear availability.

The description of the invention is merely exemplary in nature and variations that do not depart from the general essence of the invention are intended to be within the scope of the invention. Such variations are not to be regarded as a departure from the spirit and scope of the invention.

What is claimed is:

1. A hydraulic control system for a multiple mode electro-mechanical drive unit of a motor vehicle, comprising:
   multiple torque transmitting mechanisms each including at least one friction clutch;
   multiple clutch control valves individually in fluid communication with one of the torque transmitting mechanisms and operable when actuated to change a condition of the torque transmitting mechanisms from a clutch disconnected condition to a clutch engaged condition;
   multiple solenoid valves individually paired with and in fluid communication with one of the clutch control valves; and
   a normally open variable force solenoid valve in fluid communication with the solenoid valves, operation of the variable force solenoid valve acting to set a hydraulic pressure between any of the solenoid valves in an open condition and any of the clutch control valves individually paired with the solenoid valves in the open condition.

2. The hydraulic control system for a multiple mode electro-mechanical drive unit of a motor vehicle of claim 1, further comprising a main supply line containing a hydraulic fluid, each of the torque transmitting mechanisms connected to the main supply line when the clutch control valves are actuated.

3. The hydraulic control system for a multiple mode electro-mechanical drive unit of a motor vehicle of claim 2, further including a pump operating to displace and pressurize the hydraulic fluid in the main supply line.

4. The hydraulic control system for a multiple mode electro-mechanical drive unit of a motor vehicle of claim 3, wherein the pump is a fixed displacement pump.

5. The hydraulic control system for a multiple mode electro-mechanical drive unit of a motor vehicle of claim 2, further including a combined hydraulic header, wherein each of the solenoid valves and the variable force solenoid valve is in fluid communication with the combined hydraulic header, operation of the variable force solenoid valve acting to set a hydraulic pressure of a hydraulic fluid in the combined hydraulic header.

6. The hydraulic control system for a multiple mode electro-mechanical drive unit of a motor vehicle of claim 1, wherein the multiple torque transmitting mechanisms include four torque transmitting mechanisms defining vehicle drive mechanisms, and a fifth torque transmitting mechanism defining a braking clutch.

7. The hydraulic control system for a multiple mode electro-mechanical drive unit of a motor vehicle of claim 1, further including a transmission control module connected to and commanding operation of each of the solenoid valves and the variable force solenoid valve.

8. The hydraulic control system for a multiple mode electro-mechanical drive unit of a motor vehicle of claim 7, wherein the solenoid valves include a first, a second, a third, a fourth, and a fifth solenoid valve, any of the first, second, third, fourth, or fifth solenoid valves commanded to open by the transmission control module together with the paired clutch control valves are each exposed to a same hydraulic fluid pressure.

9. The hydraulic control system for a multiple mode electro-mechanical drive unit of a motor vehicle of claim 1, wherein the multiple solenoid valves are individually operable in one of an off condition having the solenoid valve closed, and an on condition having the solenoid valve open.

10. The hydraulic control system for a multiple mode electro-mechanical drive unit of a motor vehicle of claim 1, wherein predetermined ones of the solenoid valves are provided as variable force solenoid valves provided in a normally open condition, the predetermined ones of the solenoid valves permitting fluid communication to retain two of the clutch control valves in the clutch engaged condition during a default condition of the hydraulic control system wherein operational control of the solenoid valves is lost.

11. A hydraulic control system for a multiple mode electro-mechanical drive unit of a motor vehicle, comprising:
a main supply line containing a hydraulic fluid;
multiple torque transmitting mechanisms each including at least one friction clutch and each connected to the main supply line;
multiple clutch control valves each paired in fluid communication with one of the torque transmitting mechanisms and operable when actuated to change a condition of the torque transmitting mechanisms from a clutch disconnected condition to a clutch engaged condition;
multiple solenoid valves each operable in one of an off condition having the solenoid valve closed, and an on condition having the solenoid valve open, each of the solenoid valves paired with and in fluid communication with one of the clutch control valves and further in fluid communication with a combined hydraulic header; and
a normally open variable force solenoid valve in fluid communication with the combined hydraulic header, operation of the variable force solenoid valve acting to vary a hydraulic pressure of the hydraulic fluid in the combined hydraulic header, wherein the hydraulic pressure in the combined hydraulic header acts on any one or multiple ones of the solenoid valves in the on condition to actuate any of the clutch control valves paired with the any one or multiple ones of the solenoid valves in the on condition.

12. The hydraulic control system for a multiple mode electro-mechanical drive unit of a motor vehicle of claim 11, further including a pressure regulating valve connected to the main supply line and acting to balance hydraulic operating pressure in the hydraulic control system.

13. The hydraulic control system for a multiple mode electro-mechanical drive unit of a motor vehicle of claim 11, further including a gear and clutch arrangement having a first electric motor-generator and a second electric motor-generator defining the electro-mechanical drive unit.

14. The hydraulic control system for a multiple mode electro-mechanical drive unit of a motor vehicle of claim 13, further including an exhaust backfill valve connected to a backfill circuit line, the backfill circuit line collecting hydraulic oil leakage from the clutch control valves to create a continuous flow of hydraulic oil to stators of the first electric motor-generator and the second electric motor-generator, and to clutches of the torque transmitting mechanisms.

15. The hydraulic control system for a multiple mode electro-mechanical drive unit of a motor vehicle of claim 11, further including:
an actuator feed limit valve in fluid communication with the variable force solenoid valve operating to limit a maximum pressure applied to the solenoid valves; and
a boost accumulator in fluid communication with the actuator feed limit valve acting to limit pressure oscillations from operation of the solenoid valves, including operation of a variable force solenoid valve.

16. The hydraulic control system for a multiple mode electro-mechanical drive unit of a motor vehicle of claim 15, further including:
a normally low (off) solenoid valve;
a blocking valve positioned between the normally low (off) solenoid valve and a predetermined one of the clutch control valves;
a hydraulic line connected to the main supply line and to the blocking valve; and
a blocking valve discharge line directing hydraulic oil from the blocking valve to the predetermined one of the clutch control valves;
wherein the blocking valve is operable during a default condition of the hydraulic control system wherein operational control of the solenoid valves is lost.

17. The hydraulic control system for a multiple mode electro-mechanical drive unit of a motor vehicle of claim 11, further including a transmission control module connected to and commanding operation of each of the solenoid valves, the transmission control module disposed within a valve body.

18. A multiple mode electro-mechanical drive unit of a motor vehicle, comprising:
an engine;
a hybrid automatic transmission interconnected with the engine, the hybrid automatic transmission including a gear and clutch arrangement having a first electric motor-generator and a second electric motor-generator together defining an electro-mechanical drive unit; and
a hydraulic control system operating to control operation of the hybrid automatic transmission, including:
multiple torque transmitting mechanisms each including at least one friction clutch;
multiple clutch control valves individually paired in fluid communication with one of the torque transmitting mechanisms and operable when actuated to change a condition of the torque transmitting mechanisms from a clutch disconnected condition to a clutch engaged condition;

multiple solenoid valves individually paired with and in fluid communication with one of the clutch control valves; and a normally open variable force solenoid valve in fluid communication with the solenoid valves, operation of the variable force solenoid valve acting to set a hydraulic pressure between any of the solenoid valves in an open condition and any of the clutch control valves paired with any of the solenoid valves in the open condition.

19. The multiple mode electro-mechanical drive unit of a motor vehicle of claim 18, further including:

a main supply line containing a hydraulic fluid, each of the torque transmitting mechanisms connected to the main supply line;

a sump collecting the hydraulic fluid; and a fixed displacement pump operating to displace and pressurize the hydraulic fluid in the main supply line.

20. The multiple mode electro-mechanical drive unit of a motor vehicle of claim 18, further including a transmission control module connected to and commanding operation of each of the solenoid valves and the variable force solenoid valve, the transmission control module disposed within a valve body connected to the transmission.

\* \* \* \* \*